United States Patent
McGatha et al.

(10) Patent No.: US 9,821,517 B2
(45) Date of Patent: Nov. 21, 2017

(54) 3D MANUFACTURING PLATFORM

(71) Applicant: Microsoft Technology Licensing, LLC, Redmond, WA (US)

(72) Inventors: Jesse McGatha, Sammamish, WA (US); Michael Fenelon, Seattle, WA (US); Kristofer Iverson, Redmond, WA (US); Yulin Jin, Redmond, WA (US); Hristo Ivanov, Seattle, WA (US); Erik Peterson, Kirkland, WA (US); Feng Yue, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 416 days.

(21) Appl. No.: 13/928,287

(22) Filed: Jun. 26, 2013

(65) Prior Publication Data

US 2015/0005919 A1 Jan. 1, 2015

(51) Int. Cl.
*B29C 67/00* (2017.01)

(52) U.S. Cl.
CPC ...... *B29C 67/0051* (2013.01); *B29C 67/0088* (2013.01)

(58) Field of Classification Search
CPC ................ B29C 67/0051; B29C 67/0088
USPC .................................................. 700/118, 119
See application file for complete search history.

(56) References Cited

U.S. PATENT DOCUMENTS

| | | | |
|---|---|---|---|
| 2005/0132094 A1* | 6/2005 | Wu | G06F 3/1204 710/8 |
| 2006/0010454 A1* | 1/2006 | Napoli | G06F 3/14 719/328 |
| 2006/0132514 A1* | 6/2006 | Honda | G03G 15/105 347/7 |
| 2007/0250204 A1 | 10/2007 | Ould et al. | |
| 2009/0303507 A1 | 12/2009 | Abeloe | |

(Continued)

FOREIGN PATENT DOCUMENTS

| | | |
|---|---|---|
| CN | 101526889 A | 9/2009 |
| CN | 102812463 A | 12/2012 |

(Continued)

OTHER PUBLICATIONS

International Search Report, PCT/US2014/04445B, mailed Nov. 18, 2014.

(Continued)

*Primary Examiner* — Jason Lin

(57) ABSTRACT

Embodiments relate to an operating system configured to enable arbitrary applications to output 3D models to be physically formed by arbitrary 3D manufacturing devices. The operating system manages the 3D manufacturing devices, including installation of related software, device drivers, device properties, and so forth. The operating system also provides a path through which the arbitrary applications pass arbitrary print jobs (or documents) of 3D models, in a standard format, to the 3D manufacturing devices. The operating system handles queuing and spooling on behalf of the applications and the 3D manufacturing devices. Drivers of the 3D manufacturing devices may translate the 3D models outputted by the applications (in the standard format) to instructions or device language content that is specific to the respective 3D manufacturing devices.

10 Claims, 5 Drawing Sheets

(56) References Cited

U.S. PATENT DOCUMENTS

| | | | | |
|---|---|---|---|---|
| 2010/0214598 | A1* | 8/2010 | Hoppenot | G06F 3/1205 358/1.15 |
| 2010/0235846 | A1* | 9/2010 | Yamamichi | G06F 9/4411 719/327 |
| 2011/0087350 | A1* | 4/2011 | Fogel | G06F 17/50 700/98 |
| 2012/0113457 | A1* | 5/2012 | Pettis | G06F 3/12 358/1.14 |
| 2012/0224755 | A1* | 9/2012 | Wu | G06T 17/00 382/131 |
| 2013/0297059 | A1* | 11/2013 | Grifith | G06F 17/50 700/98 |
| 2013/0329243 | A1* | 12/2013 | Pettis | F16M 13/022 358/1.13 |
| 2014/0002537 | A1* | 1/2014 | Thacker | G03G 15/556 347/19 |
| 2014/0156053 | A1* | 6/2014 | Mahdavi | B29C 67/0059 700/119 |

FOREIGN PATENT DOCUMENTS

| | | |
|---|---|---|
| EP | 1376331 A2 | 1/2004 |
| WO | 2012146943 A2 | 11/2012 |

OTHER PUBLICATIONS

"Second Written Opinion Issued in PCT Application No. PCT/US2014/044458", Mailed Date: Jun. 9, 2015, 5 pages.

"3D Manufacturing Format", Retrieved at <<http://download.microsoft.com/download/C/6/C/C6C3C6F1- E84A-44EF-82A9-49BD3AAD8F58/Windows/MS-TDPRP.pdf>>, 2013, Microsoft Corporation.

"MakerBot Guides", Retrieved at <<http://www.makerbot.com/support/guides/design/>>, Mar. 10, 2013, MakerBot Industries,LLC. Brooklyn, USA.

Rettew, Craig, "3D Printer Software", Retrieved at <<http://www.deltamaker.com/blogs/news/7629595-3d-printer-software>>, Apr. 3, 2013, pp. 5.

ECMA International Technical Committee 46, "ECMA OpenXPS Whitepaper (TC46)", Retrieved at <<http://www.ecma-international.org/activities/XML%20Paper%20Specification/TC46%20XPS%20White%20Paper.pdf, Apr. 2009, pp. 17.

"ReplicatorG is a Simple, Open Source 3D Printing Program", Retrieved at <<http://replicat.org/>>, Jan. 18, 2013, pp. 4.

"SuperCam CNC Machine Tool Control Operating System Program", Retrieved at <<http://www.super-tech.com/root/itm.asp?p1=itm-supercam>>, Nov. 14, 2006, pp. 3.

Burns, Marshall, "The StL Format", Oct. 1989, pp. 4.

"ASTM Additive Manufacturing File Format", Retrieved at <<http://amf.wikispaces.com/>>, Jan. 1, 2012.

"G-Code", Retrieved at <<http://en.wikipedia.org/wiki/STEP-NC>>, Jun. 19, 2013.

"STEP-NC", Retrieved at <<http://en.wikipedia.org/wiki/STEP-NC>>, Apr. 2013.

"Printing Three-Dimensional Objects", U.S. Appl. No. 13/910,958, filed Jun. 5, 2013, Pages.

"International Preliminary Report on Patentability Issued in PCT Application No. PCT/US2014/044458", Mailed Date: Oct. 6, 2015, 6 Pages.

"First Office Action and Search Report Issued in Chinese Patent Application No. 201480036299.4", Mailed Date: Aug. 12, 2016, 15 Pages.

"Second Office Action and Search Report Issued in Chinese Patent Application No. 201480036299.4", dated Jan. 18, 2017, 14 Pages.

* cited by examiner

3D MANUFACTURING PLATFORM

BACKGROUND

Various types of devices such as additive printers, computer numerical control (CNC) mills, laser cutters, photopolymerizers, and others are currently used for 3D manufacturing. Manufacturing systems for these 3D manufacturing devices are typically vertical solutions, meaning content-producing software is generally required to understand and produce the exact printer language that a particular target 3D manufacturing device implements. In other words, content-producing software is often coded to be specific to a particular 3D manufacturing device.

As only the inventors have observed, this tight dependency constrains content-software vendors from producing 3D models that are rich and device-neutral. As only the inventors have observed, this close coupling between 3D manufacturing devices and the software for producing and preparing content also constrains producers of 3D manufacturing devices from innovating. A device maker may not be able to make modify its hardware with improvements due to the need to maintain interoperability with existing content-producing software.

Currently, there is not a systemic mechanism to ensure that users can obtain consistent results when preforming 3D manufacturing, regardless of which content-producing software or 3D manufacturing device is used.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments described herein relate to an operating system configured to enable arbitrary applications to output 3D models to be physically formed by arbitrary 3D manufacturing devices. The operating system manages the 3D manufacturing devices, including installation of related software, device drivers, device properties, and so forth. The operating system also provides a path or application programming interface (API) through which the arbitrary applications pass arbitrary print jobs (or documents) of 3D models, in a standard format, to the 3D manufacturing devices. The operating system handles queuing and spooling on behalf of the applications and the 3D manufacturing devices. Drivers of the 3D manufacturing devices are managed by the operating system and may translate the 3D models outputted by the applications (in the standard format) to instructions or device-language content that is specific to the respective 3D manufacturing devices.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to operating system level support for 3D manufacturing. Discussion will begin with an overview of how an operating system can act as an intermediary between 3D content-producing software and 3D manufacturing devices. Details of an example printing system are described next. An example 3D model format and schema for sharing device information is the discussed, followed by explanation of example print flow processes.

Figure 1:
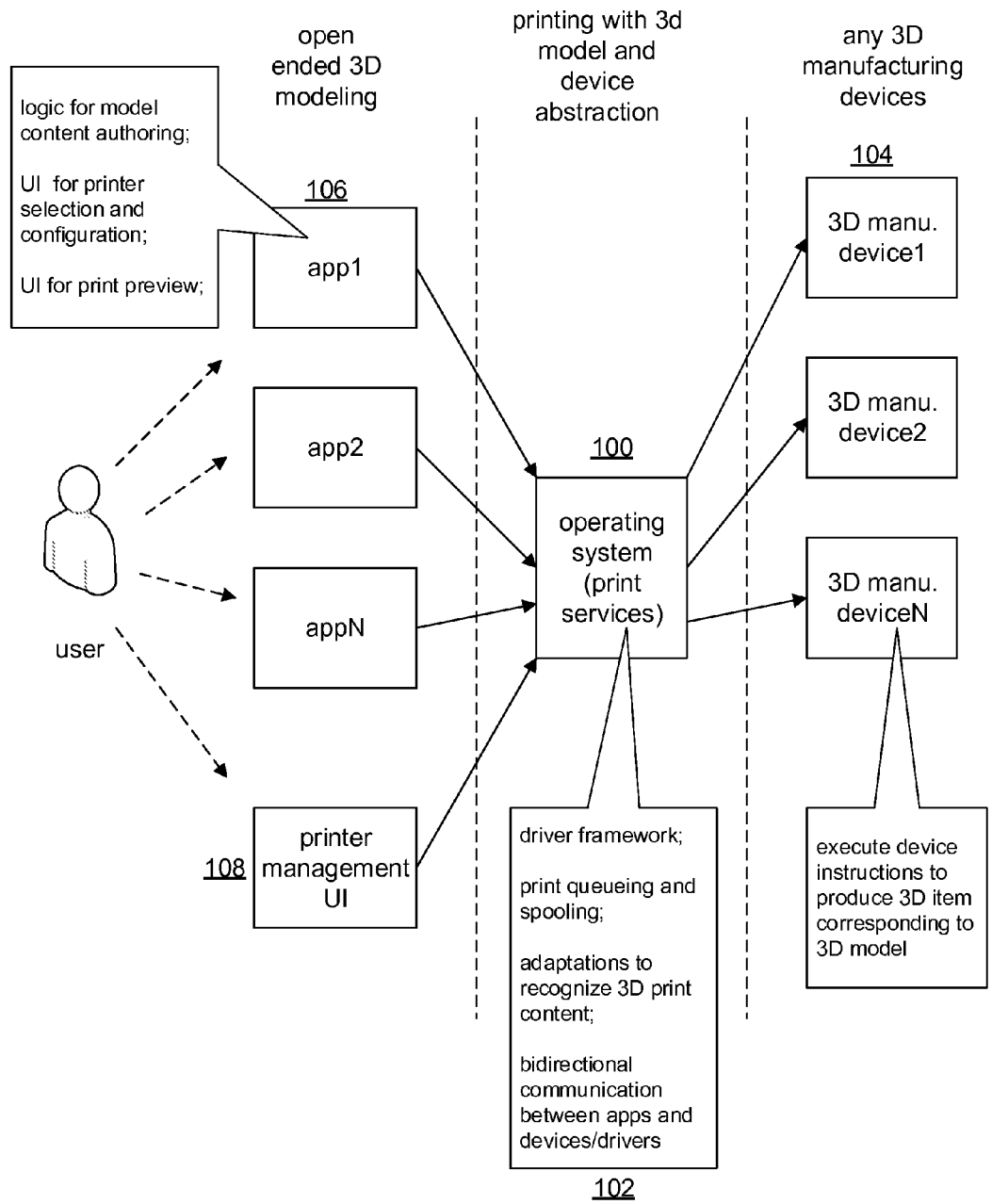
FIG. 1 shows an overview of an operating system serving as an intermediary for 3D manufacturing.

FIG. 1 shows an overview of an operating system 100 serving as an intermediary for 3D manufacturing. The operating system 100 provides various support functions 102 such as a driver framework, print queuing and spooling, bidirectional communication with 3D manufacturing devices 104, and others. The operating system 100, as adapted for 3D manufacturing support, allows any arbitrary application 106 to print 3D content to any arbitrary 3D manufacturing device 104. That is, the 3D content is decoupled from the 3D manufacturing.

A 3D manufacturing device 104 may be any of a variety of devices that add (by deposition, layering, etc.) or remove (by cutting with bits, lasers, high pressure liquid jets, etc.) raw material to form 3D physical objects. Additive 3D printers and CND mills are two types of 3D manufacturing devices. As mentioned in the Background, other types of 3D manufacturing devices may be used, for instance, photopolymerizers. Some 3D manufacturing devices may not add or remove material but rather may alter or etch the internal content of a solid material using particle beams, lasers, electromagnetic signals, and so forth. Generally, 3D manufacturing devices 104 can produce physical equivalents of arbitrary 3D models, though not all possible 3D models can be manufactured; most 3D manufacturing devices have practical limits that impose constraints or requirements that printable 3D models may meet.

An application 106 can be any type of software running on a computing device. Generally, an application 106 can be any source providing and/or generating 3D model content in any arbitrary form. An application 106 might in some instances be a model authoring application having a user interface (UI) with which a user interacts to build a 3D model, often in some proprietary internal 3D format designed for efficient interactive manipulation and rendering. Computer aided design (CAD) software and modelling or animation software are examples of applications 106 that might use the operating system 100 to print 3D content to a 3D manufacturing device 104.

An application 106, when printing via the operating system 100, outputs its 3D model in a standard 3D print format (described in detail further below) similarly outputted by any of the applications 106 (or other print sources). An application 106 that uses a non-standard 3D format or data structure might translate its 3D model to the standard 3D print format. In one embodiment, the standard 3D print format is defined by a standard schema that includes a 3D model element (possibly encompassed by a standard package format for packaging multiple files). It may be possible, in some implementations, to extend an existing print schema with definitions for 3D models and related data. When an application 106 is to print to a 3D manufacturing device 104, the application 106 may export its internal 3D model data (e.g., CAD model data) to the 3D print format specified for use by the operating system 100, which might be packaged in the standard package format. Such a print package or job containing 3D model content might also include a print ticket or other 3D manufacturing device metadata supplied by the operating system 100, such as an identifier of a target or destination 3D manufacturing device 104, information about how the destination 3D manufacturing device 104 is to be configured, print preferences, transformations such as scaling, etc.

To enable an application 106 to select and configure a 3D manufacturing device 104, the operating system 100 may have facilities or application programming interfaces (APIs) that an application 106 can use to obtain information about any of the 3D manufacturing devices available through the operating system 100. The operating system 100 may have various conventions for recognizing and managing devices such as printers. Those conventions may be configured or extended to allow 3D manufacturing devices 104 to be treated as first-class printer objects in the operating system 100. Thus, any 3D manufacturing device may be managed and used in ways familiar to the user and with consistency across different applications 106 and different 3D manufacturing devices 104. Such device management and selection may be done through user interfaces provided by the applications 106 (perhaps with common elements provided by the operating system 100), with device information populated with information obtained through services or components of the operating system 100.

Device selection and management may also be performed by a user, in a consistent way, by using a printer management user interface 108 through which any arbitrary 3D manufacturing device 104 might be installed, configured, controlled, and queried for device and/or job information or state. The printer management user interface 108 might also serve as a common point for updating drivers for 3D manufacturing devices 104, checking for firmware updates (via a network and remote support infrastructure into which the operating system 100 is tied), and so forth. In embodiment, the printer management user interface 108 is also used to manage 2D printers. In sum, a user can manage and use 3D manufacturing devices without concern for the particular devices and software to be employed.

The operating system 100 receives print packages or documents containing instances of 3D models in the standard 3D print format and with information identifying destination 3D manufacturing devices 104 and possibly device or job settings or preferences. The operating system 100 may handle queuing and spooling of those 3D print packages and direct them to appropriate device drivers, and ultimately the appropriate 3D manufacturing devices 104, where they are executed to manufacture the 3D models in the payloads of the print packages.

Figure 2:
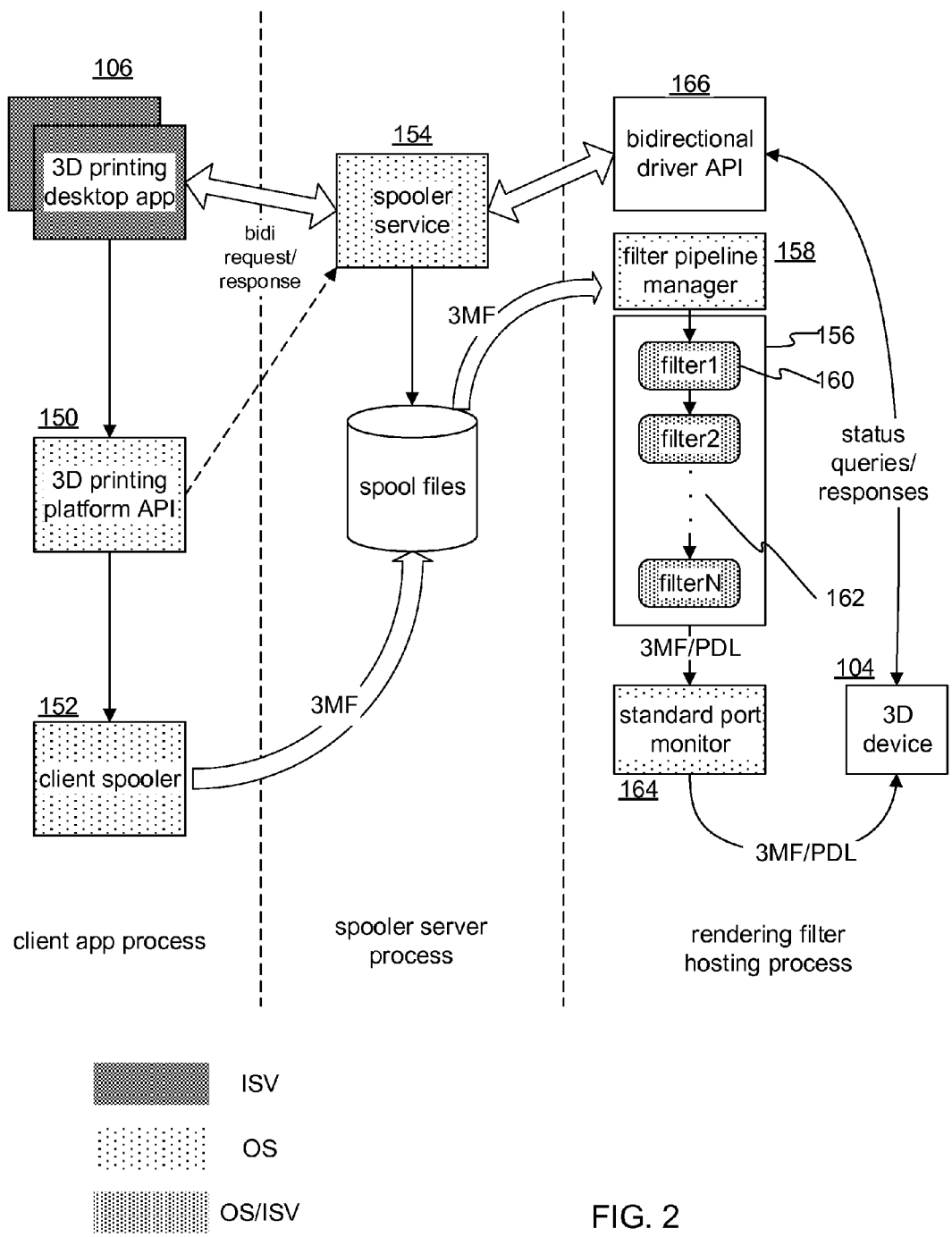
FIG. 2 shows a detailed example of an operating system providing beginning-to-end 3D manufacturing support.

FIG. 2 shows a detailed example of an operating system providing beginning-to-end 3D manufacturing support. As discussed above, an application 106 has a 3D model in any internal form. The application 106 (which can be any arbitrary application) is coded with calls to a 3D printing API 150 of the operating system. The 3D printing API 150 provides various print related functions, methods, interfaces, etc. For example, the 3D printing API 150 may include functions or methods for starting print jobs, creating standardized print packages for the print jobs (e.g., Open XPS (XML Paper Specification) packages), initiating and building standardized print documents (e.g., XPS documents) with 3D model content, querying and managing print jobs and print queues, and so forth. It is possible to modify or extend an existing printing framework to accommodate 3D printing, in which case 3D print jobs may share a same workflow as ordinary 2D print jobs. That is print queues, spoolers, etc., can be configured to process both 2D print jobs and 3D print jobs.

Regarding standard document formats for printing, each application 106 may be configured to output 3D model data into a same standard document format to be referred to as a 3D document format (3MF). In one embodiment a 3MF document standard may be implemented by an extension to the Open XPS specification that includes 3D model data. Other standards may be used, such as the Portable Document Format (PDF) as extended to allow embedding of Universal 3D files (multiple standards may be supported by one operating system). Because many 3D manufacturing devices work with stacks of 2D slices, the 3MF may be defined to allow applications to specify a variety of standard forms of 3D models, including both slice models (vector and/or bitmap graphics) as well as 3D mesh models, parametric 3D models, and so forth. In the case of slice models, slices may be described in bitmap or vector form. For additional details, see the "3D Manufacturing Format" (MS-TDPRP) published by Microsoft Corporation and incorporated herein by reference.

Returning to the 3D printing API 150, the 3D printing API may include helper functions for formatting 3MF documents and print packages so that an application may avoid having to work with XML code directly. The application need only be able to generate standard 3D content (e.g., standard-conformant mesh or slice models) for a 3MF document. The 3D printing API 150 may also be used to obtain a print ticket or other printer specification information that is packaged with a 3MF document for printing. A print ticket might specify a particular 3D manufacturing device and configuration settings for the device or the print job. To allow an application to specify a 3D manufacturing device as a printing destination, the printing framework of the operating system may be extended to allow for recognition of such devices, for example as a new system device type. In addition, operating system components, services, etc. for sharing device information may be extended to include settings and state of 3D manufacturing devices.

Once the application has prepared a print package, print job, 3DF document, or the like is passed to a spooling system. The spooling system may involve a local client spooler 152 and/or a spooler service 154. If the spooler service 154 is on another computing device, then the client spooler 152 handles passing of the print package to the spooler service 154. If the destination 3D manufacturing device is a local device (e.g., connected via a local Universal Serial Bus, a local network, or the like) then the spooler service 154 may be on the local host and the application 106 may communicate directly with the spooler service 154 via the 3D printing API 150. Other configurations for spooling of 3D print jobs may be used by the operating system 100.

The spooler service 154 may identify which 3D manufacturing device a 3D print package/document/job (sometimes "job" or "print job" for short) is destined for, select a corresponding device driver 156 (or an API thereof), possibly load the driver and/or an interface thereof, and then stream the 3D print package/document/job to the driver 156. The spooler service 154 might include or communicate with a filter pipeline manager 158. The filter pipeline manager 158 may perform tasks such as: loading and initializing filters 160 (described by a filter configuration file used to create a filter pipeline 162); managing data exchange between the filters 160 as the print package/job/document is processed; unloading filters 160 when a print package/job/document is finished; and initializing properties of the print pipeline 162.

A driver for a 3D manufacturing device generally handles rendering or conversion of the device-neutral standard-format 3D model content of a 3D print package/job/document into machine instructions (or code) executable or interpretable by the corresponding 3D manufacturing device; such code or instructions may be in a language implemented by the device. For example, a driver might be coded to understand the syntax and semantics of the standard 3D model format and convert a 3D model in such format to machine executable manufacturing instructions (for example in the form of G-Code or a proprietary printer description language (PDL)) supported by the 3D manufacturing device. The driver then passes those instructions to a standard communication port 164 or other communication channel through which the machine manufacturing instructions flow to a communication interface of the destination 3D manufacturing device. The driver 156 may also use device metadata (e.g., a print ticket) included with the 3D print job being processed when generating machine instructions.

In an embodiment where filter pipelines (or drivers capable of being configured with pluggable modules) are implemented, filters may perform functions such as geometric transformations, integrity checking of the 3D model, optimizing the machine instructions, correcting model deficiencies (e.g., making a model "watertight"), etc. Drivers and possibly filters may be provided by vendors of 3D manufacturing devices and may be installed and managed by the operating system 100. An installation package for a 3D manufacturing device may also include metadata about the device that is installed and used by components of the operating system.

Device metadata may be supplied in the form a document (e.g., XML) that conforms to a print schema definition extended to include a namespace, keywords, and/or elements that are helpful for 3D manufacturing devices. Such a schema might define or assume a specific coordinate space and print/manufacture resolution. The schema might also define device attributes or parameters (perhaps as keywords) related to 3D manufacturing device tools and their properties, such as a material type or color, an initial or default tool, a tool type, etc. The schema may also include device configuration properties and settings such as an area capable of manufacture, a depth of that area, tool temperature, build platform temperature, device language (possibly with a value set such as 3MF, stereolithography, Additive Manufacturing Format, GCode, bitmap, etc.), material-type information, filament information such as diameter and feed rate, nozzle diameter, tool travel rate, quality (e.g. draft, medium, high resolution), density, slice height, shell/wall count, support options (scaffolding added for overhangs and so forth), raft support, and others.

A device-capability document compliant to such a schema can be used by the operating system to convey device information where needed by applications, drivers, or components of the operating system. For instance, as noted above, such a document or schema-conforming data can be used to convey capabilities of a 3D manufacturing device. A compliant document may also be used to convey capability or state information to an application 106 through a bidirectional driver/API 166, to a driver, to the spooler service, or elsewhere. In addition, print tickets or other documents that comply with the schema can be used to specify device settings or manufacture/job settings that are consistent with the destination device.

Figure 3:
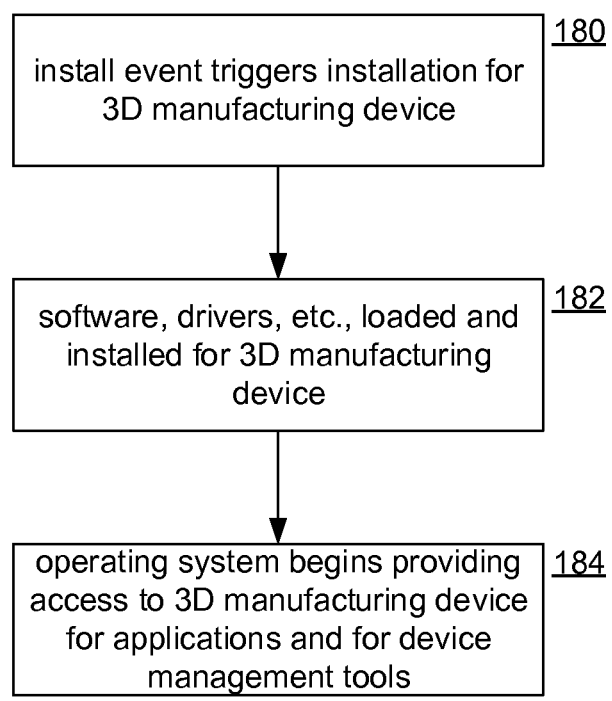
FIG. 3 shows a process for installing and configuring an arbitrary 3D manufacturing device for operating system management.

FIG. 3 shows a process for installing and configuring an arbitrary 3D manufacturing device for operating system management. When an install event occurs at step 180, such as an explicit user command or operating system detection of a new device, the operating system obtains at step 182 software for the 3D manufacturing device. The software or other installation components may be obtained from local media or from a network service. The software, e.g., drivers, filters, custom management applications, etc. are installed. The operating system adds the new device to a device tree or the like that represents various types of devices managed by the operating system, and performs other tasks to register the 3D manufacturing device.

When finished, at step 184 the 3D manufacturing device becomes available as a device object managed by the operating system (possibly as a printer device). In one embodiment, the new 3D manufacturing device is treated as a first-class printer object by the operating system. In other words, infrastructure of the operating system that supports 2D printers may support 3D manufacturing devices; 2D and 3D printing device information may co-exist in device management components. System-provided UI for managing and configuring 2D printers may also be used for managing and configuring 3D printers. When an application queries for available devices or properties the installed 3D manufacturing device may now have visibility to the application.

Figure 4:
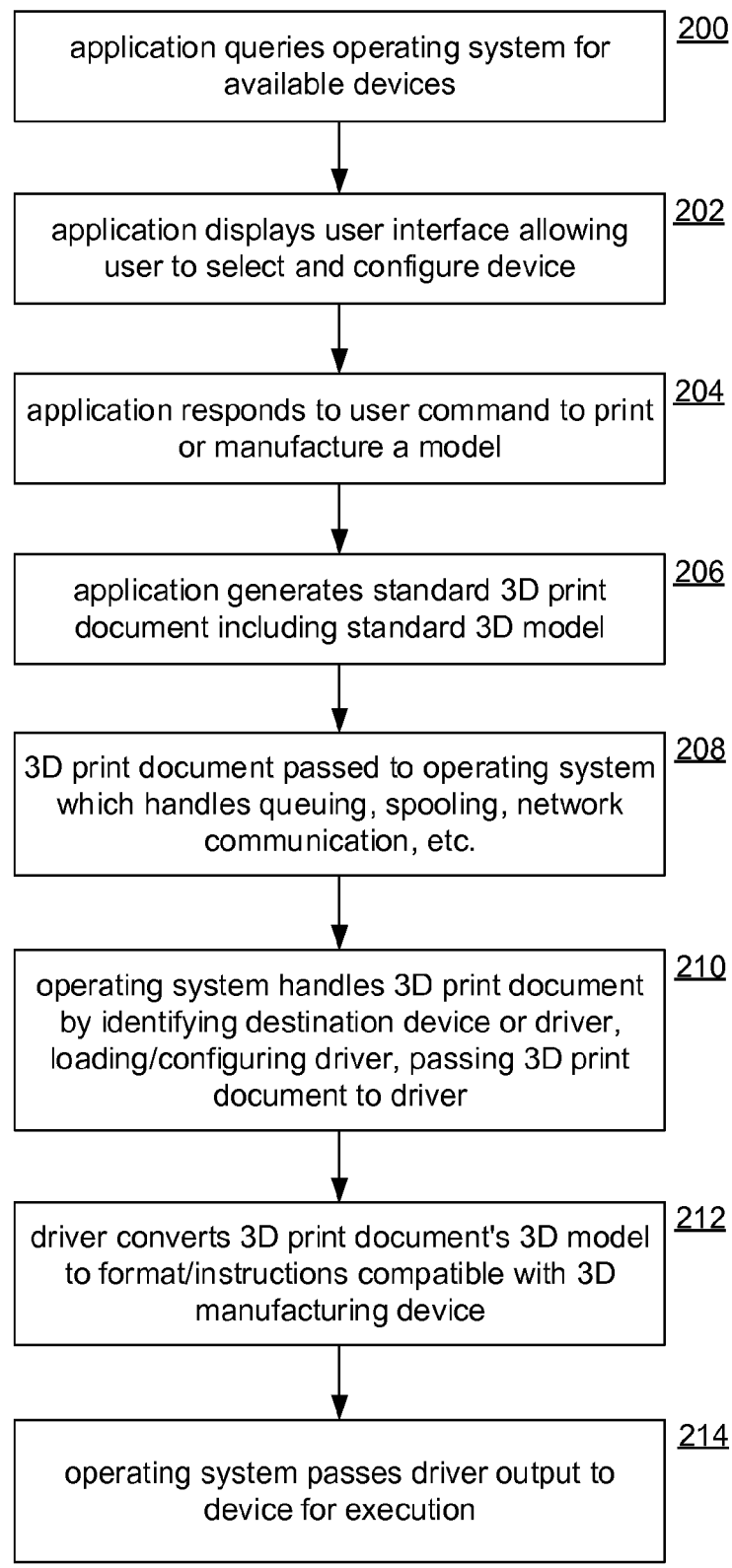
FIG. 4 shows an example process of any arbitrary application using the operating system to have 3D content manufactured by a 3D manufacturing device.

FIG. 4 shows an example process of any arbitrary application using the operating system to have 3D content manufactured by a 3D manufacturing device. As discussed earlier, an application may have logic for authoring 3D content. At step 200 the application queries the operating system to discover available devices for 3D manufacturing. At step 202 the application may display a user interface to allow a user to select and/or configure a 3D manufacturing device, with the user interface displaying options and settings conveyed by the operating system. At step 204 the application responds to a user "print" command by exporting its 3D model to a standard 3D document format (step 206). At step 208 the operating system begins managing the exported 3D document, perhaps in the form of a print job. This may involve queuing the print job, spooling the print job, possibly sending the print job over a network to a destination network spooler, and so forth.

At step 210, when the print job or standard 3D document is up (e.g., the destination 3D manufacturing device becomes available), the operating system may examine the print job and according to same load and/or configure a device driver, and pass the 3DF or standard-conforming 3D document to the device driver. At step 212 the device driver may parse the received 3D model data and translate the 3D document into a format, language, or instruction set for the destination 3D manufacturing device. An embodiment may be implemented to enable pass-through printing. This may involve an application outputting a document that is directly consumable by the destination 3D manufacturing device (e.g., 3MF or machine instructions). Nonetheless, filters in a driver might be applied to transform the document per state or settings of the destination device. At step 214 the operating system passes the output of the driver to the corresponding 3D manufacturing device, which executes the driver output to produce a physical object corresponding to the application's 3D model.

Regarding the standard 3D document format, in one embodiment such a format may include conventions to allow textures of a 3D model to be broken out into separate files or parts (within a print package). The 3D model may have references to the files where the corresponding textures are used in the model. This approach may be helpful in that when the 3D model needs to be processed at any stage needless parsing of texture data can be avoided. As noted, a 3D model may be conveyed in mesh form (triangles). With this approach, slicing logic may be performed by the device driver, which might also perform mesh repair, support structure addition (physical additions to the physical output). It may be noted that the operating system may manage execution lifetime of the device driver such that a job, which may take hours or days to complete, is not interrupted by termination of the source application, or by a user logging out of the host device, etc.

By providing 3D manufacturing support at the operating system level some types of print-related functions may become possible. For example, the operating system may be able to identify substitute or compatible 3D manufacturing devices and direct a job to a 3D manufacturing device other than one specified by an application. Similarly, the operating system may manage a large array of 3D manufacturing devices and distribute jobs among them for load balancing or the like. The support infrastructure may be able to perform other optimizations. For example, a spooling service may analyze multiple discrete print packages and combine 3D objects in those packages into a single 3D model or into a set of machine instructions that allow those objects to all be printed by the 3D manufacturing device at the same time.

In another embodiment, a remote 3D manufacturing device can be targeted by a local application by using a special device driver instead of a network print queue. A device driver might emulate a 3D manufacturing device but communicate with a network or cloud service for remote execution.

The use of the operating system as a go-between for applications and 3D manufacturing devices can also allow for previewing the appearance that a physical object would be expected to have if a specified 3D manufacturing device (and perhaps specific settings therefor) were used for a specific 3D model. For such a preview, an application may pass its 3D model through the corresponding device driver and output from the driver translating the 3D model may be passed back to the application for graphic rendering. The preview process may also be a convenient time for the driver, when processing the 3D model, to estimate an amount of necessary raw material. The application can use the preview information and possibly information from the device about available material to determine if the print job is possible or whether settings of the job may be altered to use less material. Such preview logic, since provided by the operating system, may be available for any application in combination with any 3D manufacturing device.

The operating system support for bidirectional communication between applications and 3D manufacturing devices (and/or their drivers) can be used by an application to obtain information about a 3D manufacturing device and possibly to send instructions to the 3D manufacturing device. Such a communication path can be used to obtain device temperature, query how much material (e.g., raw plastic) the 3D manufacturing device has available for production, instruct a device to calibrate, etc. Bidirectional communication may even be used for control of a device while the device is producing. For example, if multiple discrete objects are being produced at a same time, the application might instruct the device to cancel production of a specific object, possibly by updating or revising machine instructions as they are flowing to the device.

Figure 5:
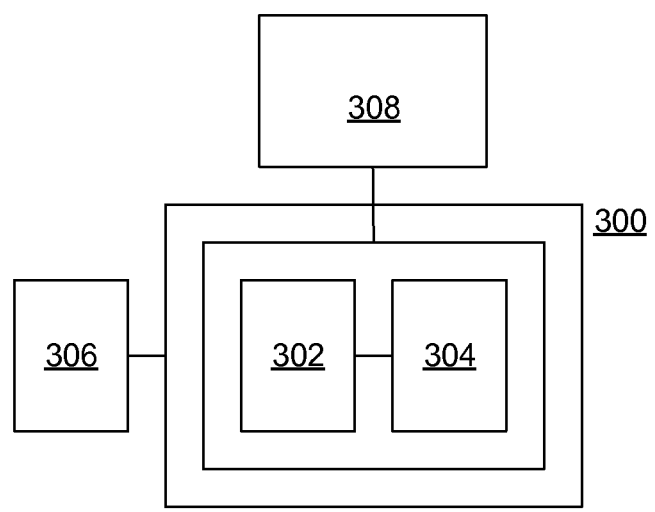
FIG. 5 shows an example of a computing device on which embodiments described above may be implemented.

FIG. 5 shows an example of a computing device 300 on which embodiments described above may be implemented. The computing device 300 may have a display 308 as well as storage 302 and a processor 304. These elements may cooperate in ways well understood in the art of computing. In addition, input devices 306 may be integrated with or in communication with the computing device 300. The computing device 300 may have any form factor or may be used in any type of encompassing device. The computing device 300 may be in the form of a handheld device such as a smartphone, a tablet computer, a gaming device, a server, or others.

Embodiments and features discussed above can be realized in the form of information stored in volatile or non-volatile computer or device readable devices. This is deemed to include at least devices such as optical storage (e.g., compact-disk read-only memory (CD-ROM)), magnetic media, holographic storage, flash read-only memory (ROM), or other devices for storing digital information. The stored information can be in the form of machine executable instructions (e.g., compiled executable binary code), source code, bytecode, or other information that can be used to enable or configure computing devices to perform the various embodiments discussed above. This is also deemed to include at least volatile memory such as random-access memory (RAM) and/or virtual memory storing information such as central processing unit (CPU) instructions during execution of software carrying out an embodiment, as well as non-volatile devices storing information that allows a program or executable to be loaded and executed. The embodiments and features can be performed on any type of computing device, including portable devices, workstations, servers, mobile wireless devices, and so on.

GLOSSARY 2D matrix. A 3×3 affine matrix used for scaling, translating, and rotating (on the same plane) geometry templates before applying the data to a given geometry.
3D matrix. A 4×4 affine matrix used for rotating, scaling, and translating an object in three-dimensional space.
3D model. The markup that defines a model for output.
3D Model part. The OPC part that contains a 3D model.
3D Texture part. The OPC part that contains a texture in the form of a raster image, e.g. JPEG, PNG, TIFF, or TBMP formats.
3MF. The 3D Manufacturing Format described by this specification, defining one or more 3D objects intended for output to a physical form.
3MF Document. The digital manifestation of an OPC package that contains a 3D payload that conforms with the 3MF specification.
3MF Document StartPart relationship. The OPC relationship from the root of the package to the 3D Model part.
Abbreviated geometry syntax. An SVG-like syntax that describes a 2D geometry in a compact form.
Action. The notion of an activity that should be performed in conjunction with the output of a 3D object, such as adding an external component inside the object, removing an object from its output platform or bed, assembling two objects, or any number of extensible possibilities.

Action invocation. The instruction to perform a specified action at a particular location in 3D space.

Action resource. The description of an action that could be performed, referenced from an object resource.

Assembly. A model that contains two or more independently-defined objects that are connected or interlocked either during or after the 3D manufacturing process is complete. An assembly might be able to be reversed or the individual parts may be inseparably interlocked.

Back. The maximum printable XZ plane of the print area or the correspondent maximum plane of a model bounding box, once transformed to the output coordinate space.

Bottom. The minimum printable XY plane of the print area or the correspondent minimum plane of a model bounding box, once transformed to the output coordinate space.

Color resource. A color that could be used for all or part of an object.

Component. An object that is added as an intact shape to the overall definition of another object.

Composite material. A material that is comprised of a ratio of other materials. Consumer. A software, service, or device that reads in a 3MF Document.

Core properties. The well-defined set package (OPC) properties that define metadata about the package as a whole, such as the author, the last modified time, and so on.

Digital signatures. A mechanism that, when present, can be used to validate that a part or payload has not been tampered with or changed since the digital signature was applied.

Editor. A software, service, or device that both reads in and writes out 3MF Documents, possibly changing the content in between.

Figure. A set of polygons or multi-segment lines (including curves). One or more figures comprise a geometry.

Fill rule. The algorithm used to determine whether any particular point is considered to be "inside" the geometry or not.

Front. The minimum printable XZ plane of the print area or the correspondent minimum plane of a model bounding box, once transformed to the output coordinate space.

Geometry. A set of single enclosed shape or unclosed, multi-segment lines expressed as figures. One or more geometries define a slice.

Geometry template. A description of a geometry that is not output on its own, but rather is intended to be referenced and reused by actual geometries.

Left. The minimum printable YZ plane of the print area or the correspondent minimum plane of a model bounding box, once transformed to the output coordinate space.

Material. The description of a physical substance that can be used to output an object.

Material resource. A potential resource that might be referenced by an object to describe what the object will be made of.

Mesh. A triangular tessellation of an object's surface.

Metadata. Ancillary information about some portion of the model, to provide more refined processing by knowledgeable producers or consumers.

Model. The set of objects that are to be manufactured as part of a single job. This may include a single object, multiple instances of the same object, multiple different objects, or multiple objects in an assembly.

Object resource. A single 3D shape that could be output by a 3D manufacturing device or used as a component in another object resource.

Payload. A complete collection of interdependent parts and relationships within a package.

PrintTicket. The contents of a PrintTicket part. Conforms to the Print Schema Specification. It is RECOMMENDED to use the standard Print Schema Keywords for 3D Manufacturing when possible.

PrintTicket part. The PrintTicket part provides settings used when the 3MF Document is printed.

Primary 3D payload root. The 3D payload discovered by the 3MF Document StartPart relationship.

Producer. A software, service, or device that writes out a 3MF Document.

Protected resource. A resource that is protected according to the protection type and placed in the <protectedresources> element.

Protection authority. The owner of the protection mechanism described by the protection type. This may be the producer that originally protected the file, the consumer that defines what protection mechanism will be accepted, or a third-party protection service, such as a digital rights management service.

Protection namespace. The XML namespace that the protection type and associated metadata are drawn from. It is declared on the <model> element.

Protection type. The qualified name for a protection mechanism that has been applied to the resources and textures of the 3MF Document. This could be as simple as an XOR obfuscation or as complex as a full digital rights management solution. The valid protection types are not defined in this specification and are implementation dependent.

Resource. A texture, color, material, action, or object that could be used by another resource or might be necessary to build a physical 3D object according to build instructions.

Rich color. Color in the scRGB, CMYK, CMYKW, or CMYKWA color spaces.

Right. The maximum printable YZ plane of the print area or the correspondent maximum plane of a model bounding box, once transformed to the output coordinate space.

Segment. One of a set of lines and curves that collectively define a figure. Slice. A 2D plane through an object, with a fixed slice height. Defined by one or more geometries.

Support. Fused filament deposition printers require supporting scaffolding for overhanging areas in the model so that filament does not fall to the platform or model below when it is extruded; this scaffolding is referred to as exterior support.

Texture. An image in JPEG, PNG, TIFF, or TBMP format that is used to provide raster image coloring of a triangle or geometry or is used to define the internal fill-material substructure of an object.

Texture resource. A resource in an object that describes the basic size and location of the texture image data.

Thumbnail. An image that helps end-users identify the contents of the package, expressed as a JPEG or PNG image.

Thumbnail part. The OPC part that contains the package thumbnail image.

Top. The maximum printable XY plane of the print area or the correspondent maximum plane of a model bounding box, once transformed to the output coordinate space.

XML namespace. A namespace declared on the <model> element, in accordance with the XML Namespaces specification.

The invention claimed is:
1. A method performed by a computing device for enabling applications on the computing device to print to two-dimensional (2D) printer and a three-dimensional (3D) manufacturing devices connected to the computing device, the method comprising:

executing an operating system, the operating system comprising an application programming interface (API) and a printing service on the computing device that is accessible to the applications on the computing device, wherein the applications communicate with the printing service via the API, the printing service comprising:

a print queue configured to queue a 2D print job and a 3D print job;

a submit function invocable via the API to add the 3D print job to the print queue; and a query function invocable via the API to query for indicia of whichever 2D printers and 3D manufacturing devices are connected to the computing device;

receiving, by the operating system, query and submit requests through the API from the applications executing on the computing device, wherein the query requests invoke the query function via the API to obtain the indicia and wherein the submit requests invoke the submit function via the API to submit the 2D print job and the 3D print job, and wherein the submitted 3D print job comprises a 3D model;

directing, by the printing service,, the 3D print job from the queue to a device driver of the 3D manufacturing device in accordance with the 3D manufacturing device being identified by a corresponding identifier of the 3D print job, the device driver executing on the computing device and controlling operations of the identified 3D manufacturing device by providing bi-directional communication between the operating system and the 3D manufacturing device; and translating by the device driver, the 3D model in the 3D print job received from the print queue into instructions implemented by the 3D manufacturing device, the instructions passed to the 3D manufacturing device by the operating system, wherein operations of the 2D printer are controlled based on the 2D print job and the operations of 3D manufacturing device are controlled based on the 3D print job.

2. A method according to claim 1, wherein the 3D model comprises 3D model data that conforms to a standard 3D model format, wherein the printing service comprises two or more printing components that form a printing pipeline on the computing device, the components configured to parse the 3D model data conforming to the standard 3D model format.

3. The method according to claim 2, wherein one of the printing components of the printing pipeline comprises a spooling service, the method further comprising receiving a submit request by the spooling service and the spooling service parsing the submit request to identify a 3D manufacturing device to which the submit request is directed.

4. The method according to claim 1, further comprising providing, by the operating system, bidirectional communication between the applications and the 3D manufacturing device.

5. A method according to claim 4, further comprising, through the bidirectional communication, receiving a query directed to the 3D manufacturing device specified by an application, accessing the 3D manufacturing device or the device driver thereof to obtain an answer to the query, and forwarding the answer to the application.

6. The method according to claim 5, wherein the answer is formatted according to a standard device schema associated with the operating system.

7. A computing device comprising:

storage storing an operating system, the operating system comprising a print pipeline configured to handle two-dimensional (2D) print jobs for a 2D printer and three-dimensional (3D) print jobs for a 3D printer, the 2D print jobs and 3D print jobs originated by applications executed by the operating system, the 2D printer and the 3D printer performing the 2D print jobs and the 3D print jobs through bus and/or network connections between the 2D printer and the computing device and between the 3D printer and the operating system;

the print pipeline comprising a queue through which the 2D print jobs and the 3D print jobs pass from the applications to the 2D printer and the 3D printer;

the operating system configured to provide an API used by the applications to submit the 2D print jobs and to submit the 3D print jobs;

the 3D printer comprising a device that produces 3D physical objects that correspond to 3D models in the 3D print jobs;

the API configured to be used by the applications to query for indicia of whichever 2D printers and 3D printers are in communication with the operating system through the bus and/or network connections;

wherein each 3D print job respectively comprises an identifier of the 3D printer and a 3D print document comprising a 3D model generated by a corresponding application;

wherein the print pipeline is configured to direct, according to the identifiers of the 3D print jobs, the 3D print jobs from the queue to a device driver of the 3D printer executing on the computing device, wherein the device driver is configured to translate the 3D print jobs into instructions implemented by the 3D printer; and a processor configured to, when powered, execute the operating system.

8. The computing device according to claim 7, the print pipeline further comprising a spooling service that handles the 2D print jobs and the 3D print jobs.

9. The computing device according to claim 7, wherein a 3D print job comprises a 3D model outputted by an application, the 3D model comprising a mesh or a stack of slices, and wherein the device driver is managed by the operating system and receives the 3D print job, produces an output that a corresponding 3D printer can use to print a physical object that corresponds to the 3D model.

10. The computing device according to claim 9, wherein the device driver comprises a plurality of filters that process the 3D model.

\* \* \* \* \*